Dec. 4, 1956 C. G. GERHOLD 2,773,007
PROCESS FOR HYDROFINING AND REFORMING FEED STOCKS
Filed July 24, 1952
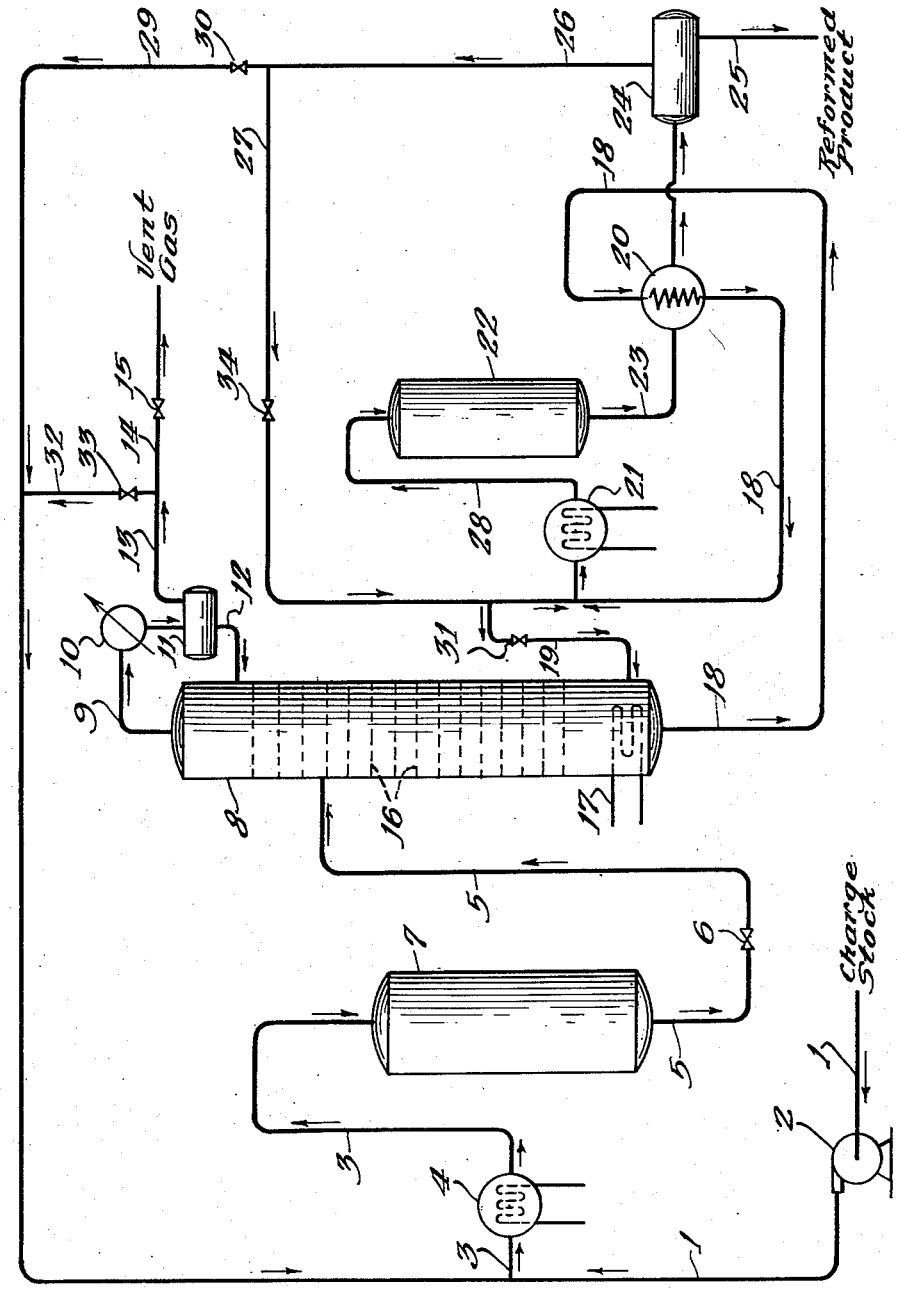
INVENTOR.
*Clarence G. Gerhold*
BY
*Chester J. Giuliani*
*Bernard L. Kramer*
*Attorneys*

United States Patent Office 2,773,007
Patented Dec. 4, 1956

2,773,007

PROCESS FOR HYDROFINING AND REFORMING FEED STOCKS

Clarence G. Gerhold, Riverside, Ill., assignor to Universal Oil Products Company, Chicago, Ill., a corporation of Delaware Application July 24, 1952, Serial No. 300,642

7 Claims. (Cl. 196—28)

This invention relates to an improved process and apparatus for treating feed stocks to remove contaminants therefrom.

In particular this invention relates to a process and apparatus for catalytically treating reformer feed stocks to remove contaminants which act as poisons to the catalyst in the subsequent reforming process. It is particularly desirable to reform straight run gasoline, natural gasoline, and/or cracked naphtha fractions since they generally exhibit poor antiknock characteristics, particularly the higher boiling fractions thereof. It has been found that catalytic reforming utilizing a catalyst comprising platinum and alumina and particularly platinum-alumina catalysts containing combined halogen, such as fluorine and/or chlorine, are especially useful in the reforming of hydrocarbons. This type of catalyst effects desirable combined reactions including hydrocracking and isomerization of paraffins, dehydrogenation of naphthenes to aromatics, and is thus particularly capable of increasing the octane number of such gasoline fractions. The resulting octane numbers are values substantially higher than those that ordinarily can be reached by thermal reforming. By an appropriate selection of operating conditions, catalyst of this type may be used for a relatively long period of time without deactivation when processing gasoline fractions that are relatively free of contaminants, which acts as poisons to the catalyst.

However, when effecting the advantageous catalytic reforming operation with platinum-alumina and combined halogen catalyst for the conversion of stocks which have relatively high amount of contaminants, there results a certain degree of selective poisoning of the catalyst and a decrease in the activity thereof.

It is, therefore, an object of this invention to remove the harmful contaminants from a reformer feed stock prior to the introduction of the feed stock into the reformer thereby preventing the deactivation of the reforming catalyst.

It is a particular object of this invention to provide a process and apparatus for effecting the catalytic removal of contaminants from a gasoline fraction in order to prevent the contamination and deactivation of the catalyst used in a subsequent reforming operation.

It has been found that the most common contaminants contained in a reformer feed stock are combined sulfur and combined nitrogen. When the feed stock contacts the reforming catalyst at reforming conditions, the combined sulfur and nitrogen are freed from the hydrocarbon molecule and are adsorbed on the active catalytic surface, or in some other way reduce the activity of the catalyst. To eliminate this difficulty, it is an embodiment of this invention to hydrogenate the combined sulfur and nitrogen and to remove them from the liquid feed stock as hydrogen sulfide and ammonia prior to the introduction of the feed stock into a reforming process.

In another embodiment the present invention relates to a process and apparatus for contacting a reforming feed stock with a catalyst in the presence of hydrogen under conditions which affect the hydrogenation of sulfur and nitrogen to produce hydrogen sulfide and ammonia, to separate the gaseous hydrogen sulfide and ammonia from the liquid feed stock prior to introducing the liquid into a reforming operation, thereby preventing the deactivation of the reforming catalyst.

In a more specific embodiment the present invention relates to a process and apparatus for the removal of contaminants from a reforming feed stock which comprises pre-heating the feed stock and introducing the pre-heated feed to a reaction zone wherein it is contacted with hydrogenating catalyst in the presence of hydrogen, thereby effecting the reactions of hydrogenating combined sulfur and nitrogen to hydrogen sulfide and ammonia, subsequently passing the effluent stream from the reaction zone to an intermediate section of a separation zone wherein the reactor effluent is contacted with a countercurrent stream of gaseous material which strips the ammonia and hydrogen sulfide produced in the reaction zone from the effluent, the hydrogen sulfide and ammonia passing upwardly out of the separation zone while the resultant contaminant free liquid product passes from the bottom of the separating zone to a reforming operation. The before mentioned countercurrent gaseous stream passes from the top of the separating zone through a cooler wherein the condensable material contained in the stream is liquefied and the resultant liquid and uncondensed gases pass into a receiver. The uncondensed gases pass from the top of the receiver while the liquified material in the receiver is returned to the separating zone as a reflux stream or is wtihdrawn from the process.

The above mentioned countercurrent gaseous stream may be reactor effluent vapors produced by a heat source in the lower section of the column, commonly known as a reboiler, or it may be a hydrogen-containing gas whose source is vent gas from the subsequent reforming process to which the purified charge stock is subjected.

One apparatus which may be used in the process of this invention can best be described with reference to the accompanying drawing. Referring now to the drawing, the charge stock enters line 1 and pump 2 which passes the feed stock to line 3 wherein the feed stock is commingled with hydrogen, the source of which will be subsequently described, from line 13. The commingled stream is pre-heated in heater 4 and passes to the upper portion of pretreating zone 7 wherein the combined stream is contacted with hydrogenating catalyst and the treating reactions described above are effected.

The effluent from the pretreating zone passes from the lower section of pretreating zone 7 through line 5 and valve 6, from which it passes to an intermediate portion of separation zone 8. In separation zone 8 the reactor effluent passes downwardly over contacting plates 16 wherein it is contacted with an ascending gas stream produced by vaporizing a portion of the pretreater effluent with reboiler or heater 17 disposed in the lower portion of separation zone 8. An alternate operation of the separation zone is to use a hydrogen-containing gas from line 19 and valve 31 as the ascending gas stream, in which case heater 17 may or may not be used. Separation zone 8 is provided with line 9 passing from the upper portion of separating zone 8 to cooler 10, wherein condensable materials contained in the ascending stream are liquefied and collected in receiver 11 as a liquid. In receiver 11 the liquid portion of the ascending gas stream is returned to the separating zone as reflux through line 12 while the gaseous portion of the ascending gas stream passes from receiver 11 through line 13 from which it may be vented to the atmosphere through line 14 and valve 15, or be returned to the pretreating zone as recycle gas through line 32 and valve 33 which enter the beforementioned line 13. Generally, when separator 8 is operated with hydrogen-containing gas as the ascending gas stream, the over-head gaseous stream will be returned to the pretreating zone as recycle gas, but if the ascending gas stream is pretreater effluent vaporized by heater 17, the over-head gas stream will be vented and the necessary hydrogen will come from the subsequent reforming process. Any combination of these flows may be used.

Separation zone 8 is provided with line 18 in the lower section thereof. The purified product passes from the lower section of separation zone 8 through line 18 to heat exchanger 20, wherein the purified stream is in indirect heat exchange with the effluent from the subsequent reforming process. The stream passes from heat exchanger 20 through line 18 to line 28, wherein the purified stream is commingled with hydrogen-containing gas from line 27. The commingled stream enters heater 21 and passes therefrom through line 28 to the upper section of reforming reactor 22 wherein the commingled stream is contacted with the above described platinum-alumina catalyst. In reforming reactor 22 the above described combined reforming reactions occur, and the reactor effluent containing reformed gasoline and hydrogen-containing gas passes from the lower section of reforming reactor 22 through line 23 to heat exchanger 20, wherein the reactor effluent is cooled by the beforementioned heat exchange with the purified stream from separator 8. The cooled reactor effluent stream passes from heat exchanger 20 through line 23 to receiver 24 wherein the liquid and gaseous phases separate. The liquid phase passes from the lower section of receiver 24 to storage as reformed gasoline. The gaseous phase passes from the upper section of receiver 24 through line 26. A portion of the gaseous stream from line 26 passes through line 27 and valve 34 to the beforementioned line 28, wherein the gaseous stream in line 27 is commingled with the purified stream in line 18. When desired, a part of the stream of line 27 may be passed through line 19 and valve 31 to provide the beforementioned countercurrent gaseous stream for separator 8. When the process is operated with heater 17 providing the countercurrent gas stream in separator 8, line 29 and valve 30 will be used to provide the hydrogen-containing gas necessary for the operation of the pretreater. Line 29 passes from line 26 through valve 30 and enters the pretreating system by passing to the beforementioned line 13 and thereafter commingling with the feed stock to the pretreater in line 3.

It is contemplated that for specific processes minor modifications of the apparatus as herein set forth may be made without removing the modified apparatus from the broad scope of this invention. Some of the modifications may be: (1) various heat exchange relations between the streams to reduce the energy requirements for operation, (2) various means of effecting the intimate contact of the streams in separator 8 such as perforated decks, any of the conventional column packings, standard bubble cap plates, etc., (3) various arrangements of valves and pumps to be consistant with the pressure levels maintained in various portions of the plant, (4) the reactors may be operated with an up-flow of material instead of the downflow pictured, etc.

Any suitable hydrogenation catalyst may be used in the pretreating zone including nickel, platinum, cobalt, molybdenum, palladium, etc., compounds of the above mentioned metals including their oxides and sulfides, or any combinations thereof. The catalysts may be used alone or composited with other materials including silica, alumina, magnesia, zirconia, thoria, etc., or any combinations thereof. The catalyst used and the conditions of operation in the treating zone will depend on the charge stock characteristics and the treatment to be effected. The separating zone may be operated at any pressure and any temperature below the critical temperature of any charge. For ordinary operation the separating zone will be operated at the highest temperature and pressure consistent with good separation so that a minimum of heat and pump capacity will be needed in transferring the treated hydrocarbon to the succeeding conversion step.

The pretreating zone may be operated at a temperature of from about 450° F. to about 900° F. or more and at a pressure of from atmospheric to about 1000 p. s. i. or more.

In a preferred embodiment the pretreating zone will contain a catalyst which is a sulfided composite of alumina, cobalt, and molybdenum. When using this catalyst, the preferred operation of the treating zone is at a temperature of from about 550° F. to about 800° F. and a pressure of from about 300 p. s. i. to about 700 p. s. i. At the preferred conditions as set forth there will be substantially no conversion of the charge stock other than the hydrogenation of contaminants which will be effected to a large degree. In the reforming zone the preferred catalyst is a composite of platinum-alumina and combined halogen and the preferred operating conditions are at a temperature of from about 100° to about 1000° F. and a pressure of from about 300 p. s. i. to about 900 p. s. i.

Following are seven examples included to illustrate the process of this invention, which are not intended to limit the invention to the materials or methods of the examples. Each example illustrates the use of the preferred catalyst for desulfurizing a different feed stock. The catalyst used in all examples is a sulfided composite of 2.5 weight percent cobalt and 2.5 weight percent molybdenum supported on alumina. The feed stocks used in each example are set forth in Table I below.

TABLE I

Example I.—Mid-Continent straight run naphtha.
Example II.—Oklahoma straight run naphtha.
Example III.—California straight run naphtha.
Example IV.—Kuwait straight run naphtha.
Example V.—Santa Maria coker distillate.
Example VI.—Oklahoma cracked naphtha.
Example VII.—California cracked naphtha.

The pertinent charge stock characteristics and the process conditions used are set forth in each example in Table II below. The figures tabulated are laboratory inspections of the effluent from the treating zone.

TABLE II

| Example No. | I | II | III | IV | V | VI | VII |
| --- | --- | --- | --- | --- | --- | --- | --- |
| Charge Stock | Mid-Continent S. R. Naptha | Okla. S. R. Naphtha | Calif. S. R. Naphtha | Kuwait S. R. Naphtha | Santa Maria Coker Distillate | Okla. Cracked Naphtha | Calif. Cracked Naphtha |
| Sulfur in Charge, wt. percent | 0.04 | 0.011 | 0.141 | 0.078 | 2.61 | 0.12 | 1.28 |
| Temperature, °F | 605 | 600 | 600 | 635 | 750 | 600 | 750 |
| Pressure, p. s. i. g | 800 | 800 | 800 | 800 | 800 | 800 | 500 |
| LHSV | 5 | 5 | 5 | 5 | 2 | 2 | 2 |
| Hydrogen, C. F./Bbl | 250 | 20 | 200 | 200 | 750 | 500 | 1000 |
| Sulfur in effluent, wt. percent | 0.0029 | 0.0033 | 0.0025 | 0.0011 | 0.088 | 0.03 | 0.0115 |
| Percent desulfurization | 93 | 70 | 98 | 99 | 97 | 75 | 99+ |

From the examples it can be seen that the process of this invention is very flexible and can be used to treat a range of stocks having widely different characteristics. The process variables can be adjusted to effect almost any degree of desulfurization desired, either percent-wise or in absolute quantity. It may be noted from Example II that by using mild operating conditions and a low amount of recycle hydrogen, the Oklahoma straight run naphtha's sulfur was reduced to a tolerable quantity although the percent-wise sulfur removal was not comparable to that of the other example. A tolerable quantity is a quantity of sulfur that can be in the charge stock without substantially affecting the activity of the catalyst. The sulfur remaining in the charge stock after pretreating in all of the above examples is well within the tolerable range for the common reforming catalysts.

It may be noted that additional hydrogen is used when treating cracked stocks. The additional hydrogen used for cracked stocks is that necessary to saturate the olefins contained therein. The saturation of olefins is advantageous because the hydrogenation of olefins reduces the coke forming tendencies of the charge stock and thereby prolongs the life of the reforming catalyst.

In all of the above examples, nitrogen removal was substantially complete.

It may be noted that in all modifications of the present invention, hydrogen-containing gas from the reforming zone provides the hydrogen for the treating zone, but contaminated hydrogen-containing gas from the treating zone never contacts the reforming catalyst.

In all examples the combined treating-reforming process gave a high yield of high octane motor fuel and the reforming catalyst activity was maintained for a period substantially longer than when reforming contaminated stocks.

I claim as my invention:

1. The process for removing contaminants from and reforming a hydrocarbon feed stock boiling in the gasoline range, which comprises treating said feed stock by hydrogenation in the presence of a hydrogenation catalyst and hydrogen in a treating zone, passing the resultant treated stream to an intermediate portion of a separation zone wherein said stream contacts an ascending gas stream, thereby stripping gaseous reaction products from said stream, passing the resultant ascending gas stream from the upper portion of said separation zone, cooling said gas stream and returning the liquefied products thereof to the upper portion of said separation zone, passing a substantially contaminant free liquid stream boiling in the gasoline range from the lower section of said separation zone to a reforming zone wherein said treated stream contacts a reforming catalyst at an elevated temperature in the presence of hydrogen, separating from the resultant reformed products a hydrogen-containing gas, and passing a portion of said gas to said treating zone.

2. The process of claim 1 further characterized in that said hydrogenation catalyst is a sulfided composite of cobalt, molybdenum, and alumina.

3. The process of claim 1 further characterized in that said reforming catalyst comprises platinum, alumina and combined halogen.

4. The process of claim 1 further characterized in that another portion of said hydrogen-containing gas from said reforming zone is passed to the lower section of said separation zone, wherein said hydrogen-containing gas comprises said ascending gas stream.

5. The process of removing contaminants from and reforming a hydrocarbon feed stock boiling in the gasoline range which comprises pre-heating said feed stock and contacting the latter with a hydrogenating catalyst in a treating zone in the presence of hydrogen at a temperature of from about 450° F. to about 900° F., passing the resultant treated stream to an intermediate portion of a separation zone wherein said stream contacts an ascending gas stream produced by a heater disposed in the lower section of said separation zone, said ascending gas stream effecting the stripping of the gaseous reaction products from said treated stream, passing the resultant ascending gas stream from the upper portion of said separating zone, cooling said gas stream and passing the resultant liquefied portion and gaseous portion of said cooled gas stream to a receiver, venting said gaseous portion and returning a portion of said liquid portion to the upper section of said separating zone, passing a substantially contaminant free treated stream boiling in the gasoline range from the lower section of said separation zone to a heat exchanger wherein said treated stream is in indirect heat exchange with an effluent stream from a subsequent reforming zone, thereafter passing said treated stream to a heater and thereafter to a reforming zone wherein said heated stream is contacted with a reforming catalyst which comprises platinum, alumina and combined halogen, effecting reforming reactions in said reforming zone in the presence of hydrogen at a temperature of from about 100° F. to about 1000° F. and a pressure of from about 300 p. s. i. to about 1000 p. s. i., passing the reformed stream from said reforming zone to said heat exchanger, and then to a receiver wherein the liquid products and gaseous products separate, passing said gaseous reformed products from the upper portion of said receiver, passing a portion of said gaseous reformed products to said reforming zone and passing another portion to said treating zone.

6. A process for the conversion of a sulfur-containing hydrocarbon distillate boiling in the gasoline range which comprises contacting said distillate in a treating zone with a hydrogenation catalyst in the presence of hydrogen under conditions to convert sulfur compounds to hydrogen sulfide, introducing the effluent of the treating zone into a separating zone and therein contacting the same with an ascending gas stream to strip hydrogen sulfide therefrom, removing the desulfurized gasoline distillate from the separating zone and catalytically reforming the same in the presence of hydrogen, separating a hydrogen-containing gas from the resultant reformed gasoline products, introducing at least a portion of the last-named gas to the separating zone as said ascending gas stream and supplying hydrogen-containing gas from the separating zone to said treating zone.

7. The process for removing contaminants from and reforming a hydrocarbon feed stock boiling in the gasoline range, which comprises treating said feed stock by hydrogenation in the presence of a hydrogenation catalyst and hydrogen in a treating zone, passing the resultant treated stream to an intermediate portion of a separation zone wherein said stream contacts an ascending gas stream, thereby stripping gaseous reaction products from said stream, passing the resultant ascending gas stream from the upper portion of said separation zone, passing a substantially contaminant free liquid stream boiling in the gasoline range from the lower section of said separation zone to a reforming zone wherein said treated stream contacts a reforming catalyst at an elevated temperature in the presence of hydrogen, separating from the resultant reformed products a hydrogen-containing gas and passing a portion of said gas to said treating zone.

References Cited in the file of this patent

UNITED STATES PATENTS

| | | |
|---|---|---|
| 2,147,268 | Pyzel | Feb. 14, 1939 |
| 2,417,308 | Lee | Mar. 11, 1947 |
| 2,606,141 | Meyer | Aug. 5, 1952 |
| 2,636,909 | Oblad et al. | Apr. 28, 1953 |
| 2,654,694 | Berger et al. | Oct. 6, 1953 |
| 2,671,754 | De Rosset et al. | Mar. 9, 1954 |